Jan. 31, 1967 I. REZNIK 3,301,952

COMBINATION TELEVISION PHONOGRAPH ASSEMBLY

Filed April 20, 1964

INVENTOR.
Israel Reznik
BY Polachek & Saulsbury
ATTORNEYS.

3,301,952
Patented Jan. 31, 1967

3,301,952

COMBINATION TELEVISION PHONOGRAPH ASSEMBLY

Israel Reznik, 132 Ludlow St., New York, N.Y. 10002

Filed Apr. 20, 1964, Ser. No. 361,186
6 Claims. (178—7.9)

This invention relates generally to a combined television set and a phonograph and more particularly to a novel mounting for the phonograph at the top of the television set.

A primary object of the present invention is to provide a television set having a hinged cover for closing the open top thereof, with a phonograph supported in operative or inoperative position by the hinged cover of the television set.

Another object of the invention is to mount a phonograph on the hinged cover of a television set and provide cooperating means on the casing of the television set and on the phonograph for releasably supporting the phonograph in operative position.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figures 1, 2, 3, 4, 5, 6:
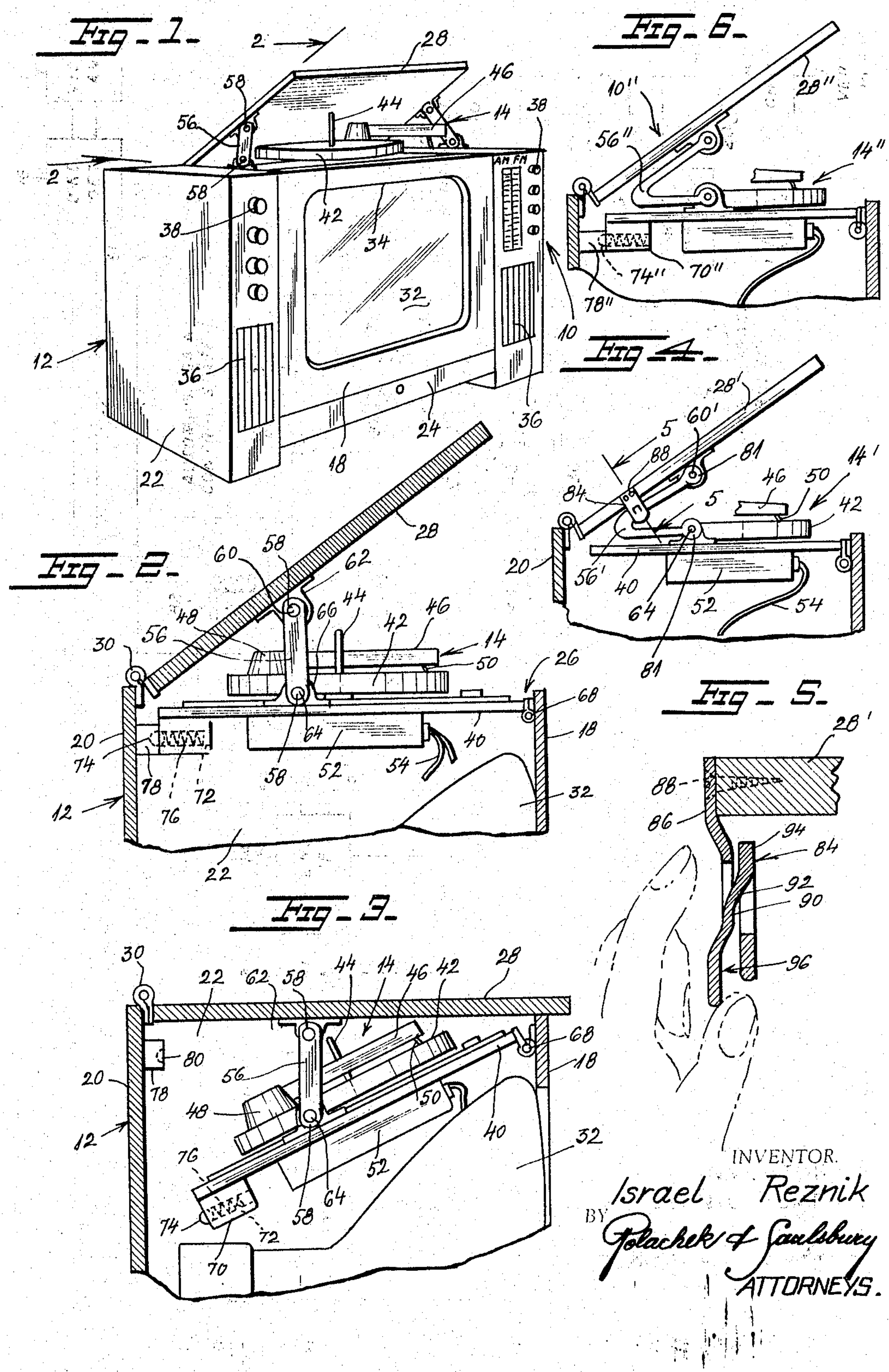
FIG. 1 is a front perspective view of a combined television set and phonograph embodying one form of the invention, the cover of the television set being shown in open position and the phonograph in operative position.
FIG. 2 is a sectional view taken on the line 2—2 of FIG. 1, on an enlarged scale.
FIG. 3 is a similar view but showing the television set cover closed and the phonograph in inoperative position.
FIG. 4 is a view similar to FIG. 2 showing a modified form of means for releasably holding the phonograph in operative position.
FIG. 5 is a vertical sectional view taken on the line 5—5 of FIG. 4, on an enlarged scale.
FIG. 6 is a view similar to FIG. 2 showing another modified form of the invention.

Referring now in detail to the various views of the drawing wherein similar reference numerals are used to indicate similar parts throughout, a combined television set and phonograph assembly embodying the invention is shown in FIG. 1 and designated generally at 10. The combined television set and phonograph 10 consists of a television set 12 and a phonograph 14.

The television set 12 is of ordinary construction including a rectangular-shaped wooden case with a front wall 18, rear wall 20, and side walls 22, 22 and with a bottom wall 24. The front, rear and side walls define an open top 26 which is closed by a wooden cover 28 hinged to the top of the rear wall 20 by a hinge structure 30. A picture tube 32 is housed in the case and closes an opening 34 in the front wall 18 of the case. Adjustable louvers 36 are formed in the front wall at opposite sides of the picture tube, communicating with the loud-speakers for exit of the sound. Control knobs 38 are mounted on the front wall above the louvers.

The phonograph 14 is conventional, comprising a base or platform 40 mounting a turntable 42 with a central upright post 44 for positioning records. An elongated tone arm 46 is swingably connected to a bearing member 48 adjacent the periphery of the turntable. The tone arm carries a needle 50. The electrical equipment is housed in a casing 52 supported on the undersurface of the base or platform 40 and is connected to conductors 54.

In accordance with the invention, the phonograph 14 is pivotally mounted on the hinged cover 28 of the television set. This mounting includes a flat link member 56 with perforations 58 at the free ends thereof. One end of the link member is pivotally mounted on a pivot pin 60 supported in a bracket 62 secured to the inner surface of the cover 28. The other end of the link member 56 is similarly connected to a pivot pin 64 supported in a bracket 66 secured to the upper surface of the base or platform 40. The platform is hinged at its front to the top of the front wall 18 by means of a hinge structure 68. By reason of this construction, the phonograph is carried up and down by the cover 28 during up and down movements thereof, around the hinge structure 68.

An important feature of the present invention is means for releasably holding the phonograph in upward operative position on a horizontal plane as shown in FIG. 2. For this purpose, a block 70 is secured to the undersurface of the base or platform 40 at the rear thereof. A recess 72 is formed in the block 70 opening rearwardly thereof and mounted in the outer end of the recess, there is a ball detent 74 urged outwardly by a coil spring 76 in the recess. At the top of the rear wall 20 on the inner surface thereof, there is a block 78 formed with a semispherical recess 80 for receiving the ball detent 74 and holding the phonograph in elevated level operative position as shown in FIG. 2. Downward pressure on the cover 28 will force the ball detent out of the recess 80 and carry the phonograph down to inoperative position as shown in FIG. 3.

It will thus be seen that the phonograph 14 is elevated to operative position and lowered to inoperative position automatically by raising and lowering the cover 28 of the television set.

In FIGS. 4 and 5, modified means for pivotally mounting the phonograph 14' on the hinged cover 28' is shown. This means includes a V-shaped link member 56' with perforated enlarged heads 81 at the free ends thereof. One head 81 is pivotally mounted on pivoted pin 60' and the other head 81 on the pivot pin 64'.

Modified means for releasably holding the phonograph 14' in elevated operative position is also shown. This form comprises a latching device 84 carried by one side edge of the cover 28'. The latching device consists of a rectangular-shaped plate member 86 having one end fastened to the side edge of the cover by means of screws 88, the plate extending radially and inwardly of the cover. Midway the ends of the plate the body thereof is offset slightly from the plane of the body as indicated at 90. The material of the offset portion 90 is outstruck, forming a bracket 92, and formed integrally with the bracket and supported thereby is another rectangular plate 94 disposed parallel to the offset portion 90 and closely spaced from the inner end of plate member 86, thereby providing a space 96 therebetween for receiving one leg of the link member 56'. The lower ends of the plate 94 and of the plate member 86 constitute spring fingers adapted to grip the leg of the link member and hold the phonograph releasably in upper horizontal operative position as shown in FIG. 4. Upward manual pressure on the bottom end of plate member 86 as shown in FIG. 5 will readily release the hold on the link member 56'.

The modified form of combined television set and phonograph assembly 10'' shown in FIG. 6 combines the pivotal mounting of the phonograph 14'' on the cover 28'', including the V-shaped link member 55'' shown in FIGS. 4 and 5, together with the releasable means for holding the phonograph 14'' in elevated operative position, including the recesses block 78'' and the spring-pressed detent 74'' in the block 70'' shown in FIG. 2.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A television set and phonograph assembly comprising a rectangular casing for a television set, said casing having front, rear, side and bottom walls, the front, rear and side walls defining an open top, a cover hingedly connected to the rear wall for closing said open top, a phonograph pivotally connected between the cover and top of the front wall, means connected to the cover and the phonograph for holding the phonograph in operative position, and a spring-pressed ball detent carried by the phonograph, said rear wall of the casing having a semispherical recess for receiving the ball detent.

2. A television set and phonograph assembly comprising a rectangular casing for a television set, said casing having front, rear, side and bottom walls, the front, rear and side walls defining an open top, a cover hingedly connected to the rear wall for closing said open top, a phonograph pivotally connected between the cover and the top of the front wall, said phonograph including a platform, a turntable on the platform and a tone arm with a needle at one end above said turntable, said pivotal connection including a flat link member having one free end pivotally connected to the inner surface of the cover and having its other free end pivotally connected to the platform of the phonograph.

3. A television set and phonograph assembly comprising a rectangular casing for a television set, said casing having front, rear, side and bottom walls, the front, rear and side walls defining an open top, a cover hingedly connected to the rear wall for closing said open top, a phonograph pivotally connected between the cover and the top of the front wall, said phonograph including a platform, a turntable on the platform and a tone arm with a needle at one end above said turntable, said pivotal connection including a flat link member having one free end pivotally connected to the inner surface of the cover and having its other free end pivotally connected to the platform of the phonograph, and means for releasably holding the phonograph in operative upper position.

4. A television set and phonograph assembly comprising a rectangular casing for a television set, said casing having front, rear, side and bottom walls, the front, rear and side walls defining an open top, a cover hingedly connected to the rear wall for closing said open top, a phonograph pivotally connected between the cover and the top of the front wall, said phonograph including a platform, a turntable on the platform and a tone arm with a needle at one end above said turntable, said pivotal connection including a flat link member having one free end pivotally connected to the inner surface of the cover and having its other free end pivotally connected to the platform of the phonograph, and means for holding the phonograph in upper operative position including a spring-pressed ball detent carried by the phonograph, said rear wall of the casing having a semispherical recess for receiving the ball detent.

5. A television set and phonograph assembly comprising a rectangular casing for a television set, said casing having front, rear, side and bottom walls, the front, rear and side walls defining an open top, a cover hingedly connected to the rear wall for closing said open top, a phonograph pivotally connected between the cover and the top of the front wall, said phonograph including a platform, a turntable on the platform and a tone arm with a needle at one end above said turntable, said pivotal connection including a V-shaped link having one free end pivotally connected to the inner surface of the cover and having its other free end pivotally connected to the platform of the phonograph, and means for holding the phonograph in upper operative position including a latching plate secured to the side edge of the cover, said plate having an offset portion intermediate its ends, said offset portion having an outstruck portion serving as a bracket and a plate formed integrally with the bracket and supported thereby parallel to the latching plate, the bottom ends of the latching plate and bracket plate being spaced apart to receive one leg of the V-shaped link for releasably holding the phonograph in upper operative position.

6. A television set and phonograph assembly comprising a rectangular casing for a television set, said casing having front, rear, side and bottom walls, the front, rear and side walls defining an open top, a cover hingedly connected to the rear wall for closing said open top, a phonograph pivotally connected between the cover and the top of the front wall, said phonograph including a platform, a turntable on the platform and a tone arm with a needle at one end above said turntable, said pivotal connection including a V-shaped link having one free end pivotally connected to the inner surface of the cover and having its other free end pivotally connected to the platform of the phonograph, and means for holding the phonograph in upper operative position including a spring-pressed ball detent carried by the phonograph, said rear wall of the casing having a semi-spherical recess for releasably receiving the ball detent.

References Cited by the Examiner

FOREIGN PATENTS 938,384 1/1956 Germany.

DAVID G. REDINBAUGH, *Primary Examiner.*

R. L. RICHARDSON, *Assistant Examiner.*